United States Patent [19]

Kurihara et al.

[11] Patent Number: 4,597,932
[45] Date of Patent: Jul. 1, 1986

[54] METHOD OF MANUFACTURING SYNTHETIC RESIN PEN NIBS

[75] Inventors: Norigi Kurihara, Yachio; Ryutaro Sakuda, Tokyo, both of Japan

[73] Assignee: Aubex Corporation, Tokyo, Japan

[21] Appl. No.: 624,003

[22] Filed: Jun. 25, 1984

[30] Foreign Application Priority Data

Jun. 27, 1983 [JP] Japan ............... 58-114372

[51] Int. Cl.⁴ .................................... B29C 47/90
[52] U.S. Cl. .................... 264/145; 264/557; 264/562; 264/150; 264/159; 264/209.5; 264/210.4; 264/235.6; 264/288.8; 264/346
[58] Field of Search ........... 264/148, 150, 209.5, 264/210.7, 235.6, 346, 288.8, 289.3, 557, 562, 567, 145, 159, 210.4

[56] References Cited

U.S. PATENT DOCUMENTS

| | | | |
|---|---|---|---|
| 3,538,208 | 11/1970 | Ohtsuka | 264/209.5 |
| 3,627,868 | 12/1971 | Funahashi | 264/171 |
| 3,778,495 | 12/1973 | Woolley | 264/177 F |
| 3,840,632 | 10/1974 | Maxion et al. | 264/130 |
| 3,933,965 | 1/1976 | Gallone et al. | 264/177 F |
| 3,946,094 | 3/1976 | Kanetsuna et al. | 264/178 F |
| 3,963,678 | 6/1976 | Conrad et al. | 264/178 F |
| 4,002,709 | 1/1977 | Mozer | 264/150 |
| 4,098,864 | 7/1978 | Morris et al. | 264/289.3 |
| 4,233,022 | 11/1980 | Brady et al. | 425/525 |
| 4,362,683 | 12/1982 | Otsuka et al. | 264/167 |

FOREIGN PATENT DOCUMENTS 2214543 10/1972 Fed. Rep. of Germany ... 264/176 R
2169160 9/1973 France .

Primary Examiner—Jeffery Thurlow
Attorney, Agent, or Firm—Renner, Otto, Boisselle & Lyon

[57] ABSTRACT

Method of manufacturing synthetic resin pen nibs is disclosed, which pen nibs may suitably be employed in writing instruments for fine lettering or drawing fine lines. The pen nibs are formed of thermoplastic crystalline synthetic resin, e.g. polyethylene terephthalate resin, which is extruded from a molding die and subjected to rapid cooling to form a continuous rod in amorphous state. The rod is axially stretched under predetermined temperature condition to achieve oriented crystallization of the resin molecules, and is further heat-treated such that non-oriented fine crystals are dispersed and grown between oriented crystals and remaining amorphous regions. Pen nib thus obtained has highly improved physical and chemical properties.

11 Claims, 5 Drawing Figures

FIG_1
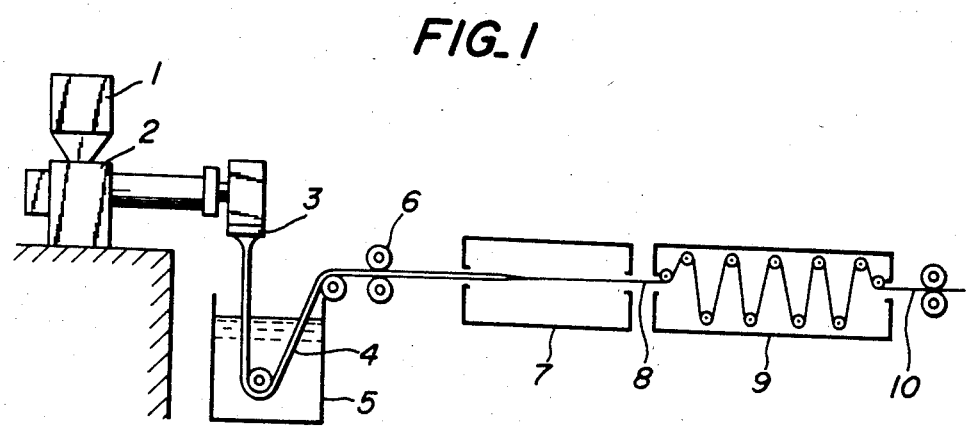
FIG_2A
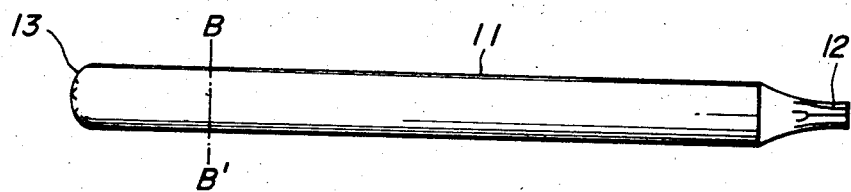
FIG_2B
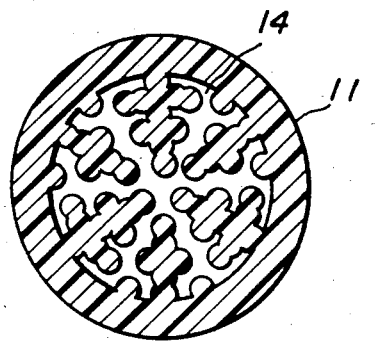
FIG_3
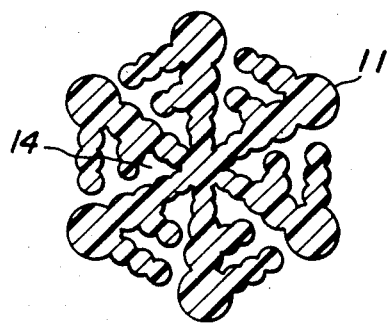

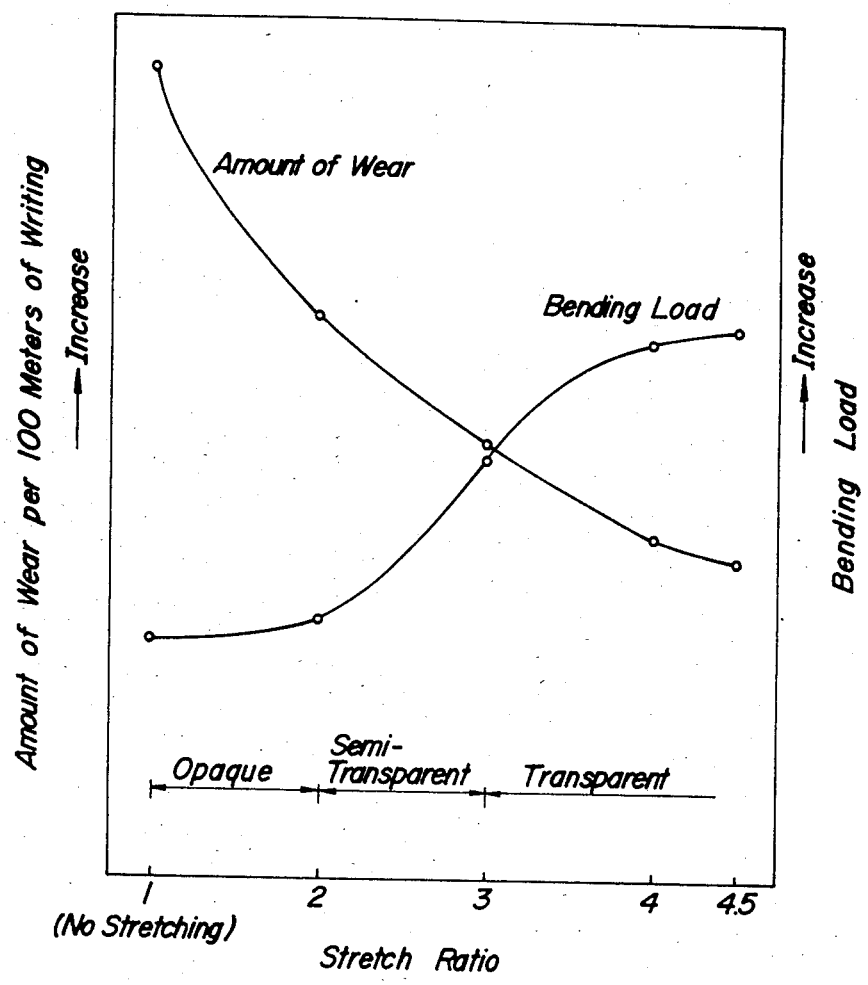
FIG_4

METHOD OF MANUFACTURING SYNTHETIC RESIN PEN NIBS

BACKGROUND OF THE INVENTION

1. Field of the Invention

The present invention relates to a method of manufacturing a pen nib comprising a rod-like core made of a thermoplastic synthetic resin and having axially continuous ink-conducting capillary channels of suitable cross-sectional shape, which may suitably be employed in writing instruments for fine lettering or for drawing fine lines.

2. Description of the Prior Art

Up to the present, the large majority of writing instruments for fine lettering or tracing fine lines, which are generally available on marketplace, have employed polyacetal resin pen nibs of relatively small diameter.

However, due to the practical limitations arising from insufficient flexural strength of conventional polyacetal resin pen nibs, the length of exposure of the writing tip from the pen nib holder in these writing instruments has been restricted. When the polyacetal resin pen nib has an outer diameter of 0.8 mm, for example, these instruments are normally provided with a writing tip exposure length of from 1.0 to 1.5 mm in order to avoid breakdown or snap of the pen nibs when applied with the writing pressure, at the sacrifice of flexible and/or resilient writing feel which is an important requirement to be fulfilled. Thus, there has been demand for the development of synthetic resin pen nibs with an excellent flexural strength, that do not break or snap even at larger exposure lengths.

The above-described type of polyacetal pen nib develops from about 0.015 to 0.250 mm of tip wear per 100 meters of writing on commercially available high-grade paper or high-grade photocopier paper under a writing pressure of about 100 g. As a result, under the above-mentioned restricted writing tip exposure length and depending on the type of paper used, the writing tip may excessively wear down to have a writing life of only about 500 meters. This has prompted calls for the development of a synthetic resin pen nib with good wear resistance.

In addition, considerable variation may arise in the writing life of the writing instrument, depending on whether the principle solvent in the ink composition used is water, an organic solvent, or a mixture of the two. A synthetic resin pen nib that combines good chemical resistance and resistance to organic solvents with the physical properties already noted above has thus been awaited.

SUMMARY OF THE INVENTION

Accordingly, it is an object of the present invention to provide a novel method of manufacturing a greatly improved synthetic resin pen nib for writing instruments which mitigates the above-mentioned drawbacks of conventional pen nibs.

Another object of the present invention is to provide a method of manufacturing a novel synthetic resin pen nib having an improved writing performance, an excellent writing quality and a considerably prolonged writing life.

Still another object of the present invention is to provide a method of manufacturing a synthetic resin pen nib with an excellent flexural strength, improved wear resistance, and satisfactory chemical resistance and resistance to organic solvents.

In order to achieve these and other objects, according to the present invention, there is provided a method of manufacturing synthetic resin pen nibs, which comprises:

extruding a molten thermoplastic crystalline synthetic resin from a molding die with a suitable orifice shape, and forming said synthetic resin into a continuous rod of desired cross-sectional shape by rapid cooling to place the resin in as amorphous a state as possible;

forming a monofilamentous core with capillaries by stretching said rod axially under a suitable temperature condition lying within a range that extends from the glass transition point to below the melting point of said synthetic resin while at the same time reducing the rod diameter to achieve oriented crystallization of the synthetic resin molecules;

heat-treating said monofilamentous core such as to cause the growth of non-oriented fine crystals between said oriented crystals and accelerate the crystallization of the synthetic resin molecules, to thereby form a mixed crystal structure essentially consisting of oriented crystals, non-oriented fine crystals dispersed and grown between said oriented crystals, and remaining amorphous regions; and cutting the heat-treated monofilamentous core into rod-like cores of desired length and shaping at least one end of each rod-like core into appropriate writing tip configuration.

The present invention will be more fully described hereinafter, firstly with respect to the general aspect of the invention, and then by referring to some preferred methods of manufacturing pen nibs according to the invention and shown in the following drawings.

BRIEF DESCRIPTION OF THE DRAWINGS

FIG. 1 is a schematic view showing one embodiment of the manufacturing process according to the present invention;

FIG. 2A shows the side view of one example of pen nib manufactured by the process shown in FIG. 1;

FIG. 2B is a cross-sectional view taken along the line B—B' in FIG. 2A;

FIG. 3 is a cross-sectional view of another example of pen nib manufactured by the process shown in FIG. 1; and FIG. 4 is a diagram showing the relationship between the stretch ratio during the stretching operation, versus the wear resistance and flexural strength of the pen nib manufactured according to the invention.

DETAILED DESCRIPTION OF THE INVENTION

The present invention has been accomplished after comprehensive researches and experimental studies to develop a novel method of manufacturing highly improved synthetic resin pen nibs with excellent physical and chemical properties as mentioned above, in the course of which the inventors found that the physical properties of the synthetic resin pen nibs are strongly affected by the crystallization state of the synthetic resin molecules during the manufacturing process when thermoplastic crystalline synthetic resin is used. As the results of further experimental studies made in order to ascertain an effective crystallization state, it has been recognized that, in the manufacturing process involving the extrusion and cooling of thermoplastic crystalline synthetic resin, additional provision of stretching-heating treatment, which is to be effected under specifically controlled conditions adjusted in relation to the cooling conditions, realizes a mixed crystal structure essentially consisting of molecularly oriented crystals, non-oriented fine crystals grown and dispersed between said oriented crystals, as well as remaining amorphous regions, and advantageously resolves the above-mentioned drawbacks. Such a recognition led ultimately to the present invention.

As has already been noted above, a synthetic resin pen nib must excell in such properties as wear-resistance and flexural strength. Hence, based on the recognition obtained by the inventors, the crystallization state of the pen nib must be that of a mixed crystal.

The present invention thus essentially concerns the improvement in a pen nib for a writing instrument whereby molecules of thermoplastic crystalline synthetic resin are in a mixed crystallizaton state forming a structure essentially consisting of molecularly oriented crystals, non-oriented fine crystals dispersed and grown between said oriented crystals, and remaining amorphous regions.

The present invention will now be described in greater detail, beginning with the explanation with respect to the significance of formation of the specific mixed crystal structure according to the invention.

Namely, according to the present invention, first of all, the molecules of the thermoplastic crystalline synthetic resin are subjected to oriented crystallization. This provides an outstanding resistance to wear of the writing tip by friction with the paper surface during writing.

Furthermore, non-oriented fine crystals are caused to grow and disperse between these oriented crystals, which results in a higher degree of crystallization and the formation of a mixed crystal structure with an even finer crystallization state. This prevents relaxation of the oriented crystals, making it possible to produce a pen nib with outstanding rigidity and flexural strength. The non-oriented fine crystals dispersed and grown between the oriented crystals serve to protect against the tendency, with oriented crystallization, towards axial crack formation in the pen nib when external stresses act upon the writing tip. Generally stated, such a tendency would very likely be unavoidable in case of a mixed crystal structure wherein synthetic resin molecules are once grown into spherulites and then subjected to axial stretching by applying a large tensile stress in an attempt to induce an oriented crystallization. Moreover, according to the invention, the existence of numerous non-oriented crystals grown as fine crystals within the remaining amorphous regions has the effect of compensating for the general tendency of uncontrolled elastic or plastic deformation of the amorphous material when subjected to external stresses. As a result, the writing tip of the pen nib comes into contact with the paper surface at the synthetic resin molecular surface in a mixed crystal state that consists essentially of oriented crystals, non-oriented fine crystals, and remaining amorphous regions.

The mixed crystal structure according to the invention thus provides excellent strength and durability against external stresses such as compression, bending, and friction which the writing tip is subjected to during writing, making it possible to realize a pen nib with a long writing life and a good writing quality.

According to the present invention, in order to produce a pen nib having such a crystallization state, the manufacturing conditions are defined as follows:

First, thermoplastic crystalline synthetic resin is used which, after being extruded from the molding die having a suitable orifice shape, must be cooled rapidly to initially place the resin in amorphous state as far as possible. To this end, it is desirable to use crystalline synthetic resin materials from which amorphous rods can readily be formed or whose crystallization rate is relatively low, that have not hitherto been regarded at all as suitable raw materials. Crystalline synthetic resins with a rapid crystallization rate and for which the formation into amorphous rods is difficult, are not very appropriate both from the standpoint of manufacturing and product function, because crystals are first grown into spherulites and then stretched by the large tensile stresses which the material is subjected to during oriented crystallization. By suitably selecting the raw material, cooling and hardening can be effected under normal cooling conditions.

Second, following cooling and hardening, the synthetic resin must be stretched under a predetermined temperature such as to induce the oriented crystallization of synthetic resin molecules in a amorphous state, and disperse the amorphous regions.

The heating temperature conditions during stretching may suitably be selected from a temperature range extending from the glass transition point of the crystalline synthetic resin being used to below its melting point and, preferably, from the glass transition point to the softening point. For example, in the case of polyethylene terephthalate resin, a temperature selected from the range of 90° to 150° C. is appropriate, which permits oriented crystallization to be induced from the amorphous state with the crystalinity of 0.15 or less as measured by the so-called "density method" (ASTM[D792]; 23° C.).

The stretch ratio during stretching of the rod should be made such that dispersion of the amorphous regions by oriented crystallization can be effectively achieved. If this ratio is too small, the remaining amorphous material which did not undergo oriented crystallization undergoes non-oriented crystallization in the subsequent heat treatment process forming giant spherulites, which results in devitrification and whitening. Moreover, an excessively high crystallinity causes deterioration in the ductility and increase in the brittleness. Consequently, the stretch ratio shoud be made large enough to substantially suppress devitrification in the subsequent heat-treatment process. On the other hand, if the stretch ratio is made too large, this results in excessively oriented crystallization which is undesirable because axial cracks tend to be formed in the pen nib when external stresses act upon the writing tip. Also, when the rod has a complex cross-sectional shape, excessive stretching makes it difficult to retain the desired cross-sectional shape.

Third, after stretching, the monofilamentous core with capillaries thus obtained must be heat-treated to accelerate the non-oriented crystallization of the amorphous material finely dispersed between the oriented crystals. Conditions such as the heating temperature and time may suitably be selected in accordance with the degree to which crystallizaton is to be accelerated. However, when heating is to be effected at an elevated temperature close to the melting point, in order to prevent the oxidative decomposition of the synthetic resin molecules, heating should preferably be carried out in a non-oxidizing gas atmosphere or in a vacuum.

Improvements in the physical properties can be achieved as the crystallinity of the rod-like core following the acceleration of crystallization by the above-mentioned heat treatment approaches the maximum ultimate crystallinity of the crystalline synthetic resin material used. For example, in the case of the polyethylene terephthalate resin having a maximum ultimate crystallinity of about 0.6, the crystallinity in the mixed crystal state preferably is made at least 0.45 or made substantially the same as the maximum ultimate crystallinity achieved by the spherulite structure of the synthetic resin. The crystallinity should be increased preferably in a non-oxidizing atmosphere, in order to avoid undesirable thermal deterioration of the mixed crystal structure in an oxidizing atmosphere.

Some preferred embodiments of the present invention will now be described below.

EXAMPLE 1

As shown in FIG. 1, polyethylene terephthalate resin fed from a hopper 1 into an extruder 2 was extruded, in its molten state, from an extrusion die 3 having a suitable orifice shape and mounted onto the cylinder head of the extruder, and was shaped into a molten bar with longitudinal pores formed therein for the intended provision of ink-conducting capillary channels. Subsequently, in order to place this bar in as amorphous a state as possible, the bar was immersed in a cooling water tank 5 where it was rapidly cooled and hardened to form a transparent continuous rod 4 of desired cross-sectional shape with an outer diameter of 1.6 mm. The degree of crystallization of the synthetic resin in this rod, when measured by the above-mentioned density method, was found to be about 0.07, confirming that most of the molecules were in an amorphous state.

This rod 4 of desired cross-sectional shape was then passed to a heating oven 7 by means of adjusting rollers 6, where tensile stress was applied while heating at about 130° C. to stretch the rod continuously to about four times its original length, forming a monofilamentous core 8 measuring 0.8 mm in outer diameter and having the ink-conducting capillary channels. The crystallinity of the synthetic resin in this core, when measured as above by the density method, was found to have increased to about 0.17, confirming that stretching-induced oriented crystallization took place to form molecularly oriented crystals.

Following this, the core 8 was passed through a heating oven 9 having a non-oxidizing atmosphere formed by nitrogen gas, where it was heat-treated at about 200° C. for 30 minutes while preventing the axial shrinkage. This accelerated crystallization of the non-oriented amorphous regions within the synthetic resin, giving a transparent rod-like core 10, which was then cut to the desired lengths and shaped into an appropriate pen nib configuration. The crystallinity of the synthetic resin in the heat-treated rod-like core 10 was measured as before by the density method, whereupon it was found that crystallization had progressed even further, reaching a value of about 0.53. This confirmed that the amorphous regions dispersed by the process of oriented crystallization described above did not enlarge into spherulites, but rather, have grown between the oriented crystals as non-oriented fine crystals and, together with the oriented crystals and remaining amorphous material, formed the desired molecularly mixed crystal structure.

FIGS. 2A and 2B represent the shape of the pen nib thus obtained, in which the pen nib 11 is shown as being provided with an ink absorption end 12 and a writing tip end 13 and, in the cross-section, has ink-conducting capillary channels 14. FIG. 3 shows the cross-section of another example of the pen nib. It is of course that the present invention is not limited to pen nibs having specific cross-sectional shapes or configurations of ink-conducting capillary channels shown in FIG. 2B and FIG. 3; rather, it can be applied to various types of pen nib cross-section some of which, for example, are disclosed in U.S. Pat. No. 3,932,044 and U.S. Pat. No. Re. 30,659 both assigned to the assignee of the present invention.

The following experiments have been conducted to investigate the effects of stretching in the present invention.

The transparent rod 4 of desired cross-sectional shape and in an amorphous state obtained by rapid cooling and solidification in the above Example 1 was stretched at a temperature of 130° C. and a stretch ratio ranging from 1 to 4.5. The stretched rods were then heat-treated, promoting crystallization to a crystallinity of about 0.53. Wear and flexural strength tests were carried out with respect to the pen nibs formed from the heat-treated rods, whose test results are presented in FIG. 4. The wear test results are given as the amount of wear at the writing tip when the sample is used to write 100 meters on high-quality Japanese-made photocopier paper in a standard pen nib wear test. The flexural strength is given as the resilience (load) when a given amount of deflection is imparted to a pen nib placed across support points.

As is apparent from FIG. 4, when heat-treated in a non-stretched state, large spherulites are formed resulting in devitrification and whitening. Here, even though an excellent rigidity is attained as the maximum ultimate crystallinity is approached, the product is brittle and has inferior wear-resistance and poor elasticity. The whitening effect is due to the scattering of light by the enlarged spherulites.

However, when the stretch ratio is at least 2, there is only a slight decrease in transparency; devitrification is clearly suppressed, in addition to which a considerable reduction can be seen in the amount of wear, and the flexural strength (deflection strength) is improved. Further increase in the stretch ratio gives pen nibs with almost perfect transparency, superior rigidity and elasticity, and excellent wear resistance.

Tests were conducted to compare the physical properties of the polyethylene terephthalate resin (PET) pen nib according to the above-mentioned embodiment with those of conventional polyacetal copolymer resin (POM-C) pen nibs. The test results are shown in Tables 1 to 3.

Table 1 gives the results of tests conducted to determine the wear resistance of the pen nibs in terms of the amount of wear (mm) of the respective writing tips. The tests were carried out using a standard writing test machine with respect to pen nibs each having an outer diameter of 0.8 mm, and made to write over a length of 100 meters at an angle of 70°, a load of 100 grams, and a writing speed of 9 m/min. To clarify the variations in wear properties arising with paper type, four types of paper were used: high-grade Japanese-made paper A, high-grade Japanese-made photocopier paper D, European writing test paper B, and U.S. writing test paper C.

TABLE 1

Amount of pen nib wear (mm) on various types of writing paper per 100 meters of writing

| | PET pen nib | POM-C pen nib (1) | (2) | (3) | Wear ratio* |
|---|---|---|---|---|---|
| Writing A | 0.0075 | 0.015 | 0.015 | 0.018 | 1.1 |
| paper B | 0.012 | 0.028 | 0.031 | 0.030 | 1.5 |
| C | 0.040 | 0.163 | 0.180 | 0.190 | 1.4 |
| D | 0.076 | 0.240 | 0.249 | 0.247 | 1.2 |

*Numerator is amount of wear of PET pen nib (=1).

As is clear from Table 1, the synthetic resin pen nib of the present embodiment has an excellent wear resistance, the level of wear being less than one-half that of conventional pen nibs for all the types of paper used in the test.

Table 2 gives the results of tests conducted to determine the flexural strength, which is an important property when very slender rod-like cores are employed as pen nibs. The testing method was essentially the same as that conventionally used to determine the strength of pencil leads. The length of the writing tip projecting from the nib holder was varied and the load resistance (kg) determined at the flex yield point (angle, 60°).

TABLE 2

| | Flexural strength [kg] | | | | |
|---|---|---|---|---|---|
| | PET pen nib | POM-C pen nib (1) | (2) | (3) | Strength ratio* |
| Exposed | 1.1 | 1.31 | 0.78 | 0.86 | 0.86 | 1.57/1 |
| length | 1.5 | 1.12 | 0.62 | 0.69 | 0.70 | 1.67/1 |
| of tip | 1.8 | 0.91 | 0.58 | 0.61 | 0.64 | 1.49/1 |
| (mm) | 2.0 | 0.83 | 0.55 | 0.59 | 0.54 | 1.48/1 |

*Denominator is flexural strength of POM-C pen nib (=1).

As is evident from Table 2, the strength of the synthetic resin pen nib of the present embodiment at an ordinarily used writing tip exposure length of from 1.0 to 1.5 mm is about 1.6 times greater than that of conventional pen nibs. This strength is very advantageous when the diameter of the pen nib used in a writing instrument is made smaller than that of the embodiment. Another advantage is that the length of the writing tip extending out from the holder can be made relatively long. Thus, it can be understood that the pen nib of the present embodiment has, together with the above-mentioned wear resistance, a considerably extended writing lifetime, and an excellent writing quality afforded by suitable rigidity and elasticity.

Table 3 shows the results of tests conducted to determine the chemical and solvent resistances to various types of ink components. Pen nibs having an outer diameter of 0.8 mm and a length of 25 mm were immersed at 50° C. for three days in various ink components. Dimensional changes [%] in the outer diameter and length, and the flexural strength [g] are determined.

TABLE 3

Chemical and solvent resistances

| | PET pen nib | | | | POM-C pen nib | | | |
|---|---|---|---|---|---|---|---|---|
| Ink components | Change in diameter (%) | Change in length (%) | Flexural strength (g) | Change in strength (%) | Change in diameter (%) | Change in length (%) | Flexural strength (g) | Change in strength (%) |
| Distilled water | 0 | 0 | 123 | +3 | 0 | +0.4 | 54 | −22 |
| HCl 1 N | 0 | 0 | 127 | +2 | −5.7 | +1.2 | 20 | −71 |
| HCl 0.1 N | 0 | 0 | 126 | +3 | 0 | +0.8 | 58 | −13 |
| NaOH 1 N | 0 | 0 | 124 | 0 | 0 | +0.8 | 56 | −16 |
| NaOH 0.1 N | 0 | 0 | 125 | +2 | 0 | +0.8 | 56 | −16 |
| Ethanol | +0.6 | 0 | 124 | +2 | −0.1 | +3.2 | 44 | −35 |
| Ethylene glycol | 0 | 0 | 128 | +3 | 0 | +1.2 | 54 | −19 |
| MEK | +1.9 | +0.8 | 66 | −47 | 0 | +2.2 | 20 | −70 |
| Ethyl acetate | +1.3 | +0.4 | 90 | −28 | −0.6 | +3.0 | 32 | −53 |
| Methyl Cellosolve | 0 | 0 | 113 | −9 | 0 | +2.4 | 36 | −46 |
| Toluene | 0 | 0 | 124 | 0 | 0 | +1.4 | 38 | −43 |

Note
Flexural strength is measured as the reaction force when pressed down 0.6 mm at the center of a pitch of 15 mm.

As is clear from Table 3, the polyacetal resin used up to the present in almost all pen nibs employed in writing instruments for fine lettering or drawing fine lines, swells and undergoes a decrease in strength when immersed in organic solvents of relatively low molecular weight, commonly used as ink components, such as alcohols, glycols, and Cellosolves. However, virtually no decrease occurs in the strength of the polyethylene terephthalate resin in the present embodiment. In fact, the present embodiment is even superior when immersed in esters and ketones, which tend to produce the largest drops in strength. The pen nib of the present embodiment also has a better durability with respect to such components as HCl detected in some ink. It is thus quite clear that the pen nib of the present embodiment has superior chemical and solvent resistances to all ink components.

EXAMPLE 2

Another monofilamentous core 8 has been formed in the manner described above with reference to Example 1. This core was passed through the heating oven 9 with nitrogen gas atmosphere, where it was heat-treated at about 230° C. for one hour while preventing the axial shrinkage. The rod-like core 10 obtained in this way exhibited the crystallinity of about 0.62 as measured by the density method, which is substantially the same as the maximum ultimate crystallinity of spherulites of the synthetic resin used. The rod-like core was then cut to desired lengths and shaped into the pen nib configuration. The pen nib thus manufactured was then compared with that of Example 1 above, by which no essential differences could be recognized with respect to wear resistance, flexural strength, chemical resistance and resistance to organic solvents, except for further improved smooth writing feel.

The pen nibs of Examples 1 and 2 were compared also with pen nibs consisting of conventional material and having essentially the same cross-sectional shape, by using a writing test machine under very severe conditions. As the result, for some limited range of writing conditions, ink discharge property of the pen nib of the present invention exhibited the tendency of undergoing a slight deterioration which, however, will not be detrimental to practical use.

In the present invention, a thermoplastic crystalline synthetic resin is used as the synthetic resin pen nib raw material. Moreover, of such resins, it is desirable to use crystalline synthetic resin materials from which amorphous rods can readily be formed and whose crystallization rate is relatively low, that have not hitherto been regarded at all as suitable raw materials. Crystalline synthetic resins with a rapid crystallization rate or for which the formation into amorphous rods is difficult, are not very appropriate both from the standpoint of manufacturing and product function, because crystals are first grown into spherulites and then stretched by the large tensile stresses to which the material is subjected during oriented crystallization.

The present invention is not limited to the pen nibs consisting of polyethylene terephtalate resin; for example, pen nibs having the mixed crystal structure according to the invention can readily be manufactured from polyether etherketone resin also, whose maximum ultimate crystallinity amounts to approximately 0.48 and which belongs to thermoplastic crystalline synthetic resin with relatively low crystallization rate, like the above-mentioned polyethylene terephtalate resin. Furthermore, polyethylene 2, 6 naphthalate resin and polybutylene terephthalate resin are also considered appropriate since, for such resin materials, formation into amorphous rods can be effected without any difficulties.

The diameter of the pen nib in practice is preferably no greater than 2 mm; when reduced to 1.5 mm or less, the nib demonstrates even more distinctive results. If a monofilamentous core with such a small diameter is enclosed in a thermoplastic synthetic resin sheath, it can be used as a nib with a diameter of 2 mm or greater.

Thus, as has been amply explained above, the present invention enables manufacture of synthetic resin pen nibs for use in writing instruments, with superior physical and chemical properties required for such a pen nib. In this way, it fully responds to the demands on the marketplace for a superior pen nib.

What is claimed is:

1. A method of manufacturing synthetic resin pen nibs, which comprises:
   extruding a molten thermoplastic crystalline synthetic resin from a molding die with a suitable orifice shape, and forming said synthetic resin into a continuous rod of desired cross-sectional shape by rapid cooling to place the resin in as amorphous a state as possible;
   forming a monofilamentous core with capillaries by stretching said rod axially under a suitable temperature condition lying within a range that extends from the glass transition point to the softening point of said synthetic resin, while at the same time reducing the rod diameter to achieve oriented crystallization of the synthetic resin molecules;
   heat-treating said monofilamentous core such as to cause the growth of non-oriented fine crystals between said oriented crystals and accelerate crystallization of the synthetic resin molecules, to thereby form a mixed crystal structure essentially consisting of oriented crystals, non-oriented fine crystals dispersed and grown between said oriented crystals, and remaining amorphous regions; and
   cutting the heat-treated monofilamentous core into rod-like cores of desired length and shaping at least one end of each rod-like core into appropriate writing tip configuration.

2. A method of manufacturing synthetic resin pen nibs, as claimed in claim 1, wherein the synthetic resin in the rod of desired cross-sectional shape is placed in a state essentially consisting of non-crystalline material thereby to facilitate the fine dispersion of non-crystalline material still in an un-oriented state within the monofilamentous core during oriented crystallization, and to prevent formation of enlarged spheruloids during accelerated crystallization of the synthetic resin molecules of said core.

3. A method of manufacturing synthetic resin pen nibs, as claimed in claim 1, wherein the stretch ratio of the rod of desired cross-section during the oriented crystallization is of a degree that permits devitrification of said core to be suppressed following the completion of accelerated crystallization of the synthetic resin molecules in the monofilamentous core.

4. A method of manufacturing synthetic resin pen nibs, as claimed in claim 1, wherein the thermoplastic crystalline synthetic resin has a slow rate of crystallization.

5. A method of manufacturing synthetic resin pen nibs, as claimed in claim 1, wherein the thermoplastic crystalline synthetic resin is polyethylene terephthalate resin.

6. A method of manufacturing synthetic resin pen nibs, as claimed in claim 5, wherein the non-crystalline material state of the synthetic resin in the rod of desired cross-sectional shape, when expressed as the crystallinity measured by the density method, is 0.15 or less.

7. A method of manufacturing synthetic resin pen nibs, as claimed in claim 5, wherein the suitable temperature condition lying within a range that extends from the glass transition point to the softening point of the synthetic resin is selected from the range of 90° to 150° C.

8. A method of manufacturing synthetic resin pen nibs, as claimed in claim 5, wherein the stretch ratio of the rod of desired cross-sectional shape, when expressed as a length ratio, is at least 2.

9. A method of manufacturing synthetic resin pen nibs, as claimed in claim 5, wherein crystallization is accelerated until the crystallization state of the synthetic resin in the monofilamentous core, when expressed as the crystallinity measured by the density method (ASTM[D792]; 23° C.), is at least 0.45.

10. A method of manufacturing synthetic resin pen nibs, as claimed in claim 5, wherein the monofilamentous core is heat-treated in a non-oxidizing gas atmosphere during accelerated crystallization of the synthetic resin.

11. A method of manufacturing synthetic resin pen nibs, as claimed in claim 1, wherein the heat-treating temperature of the monofilamentous core is selected from a temperature range that extends from the glass transition point to below the melting point of the synthetic resin.

* * * * *